March 10, 1964 A. FABULA Re. 25,531
PASSENGER CONVEYOR SYSTEM
Original Filed April 22, 1960
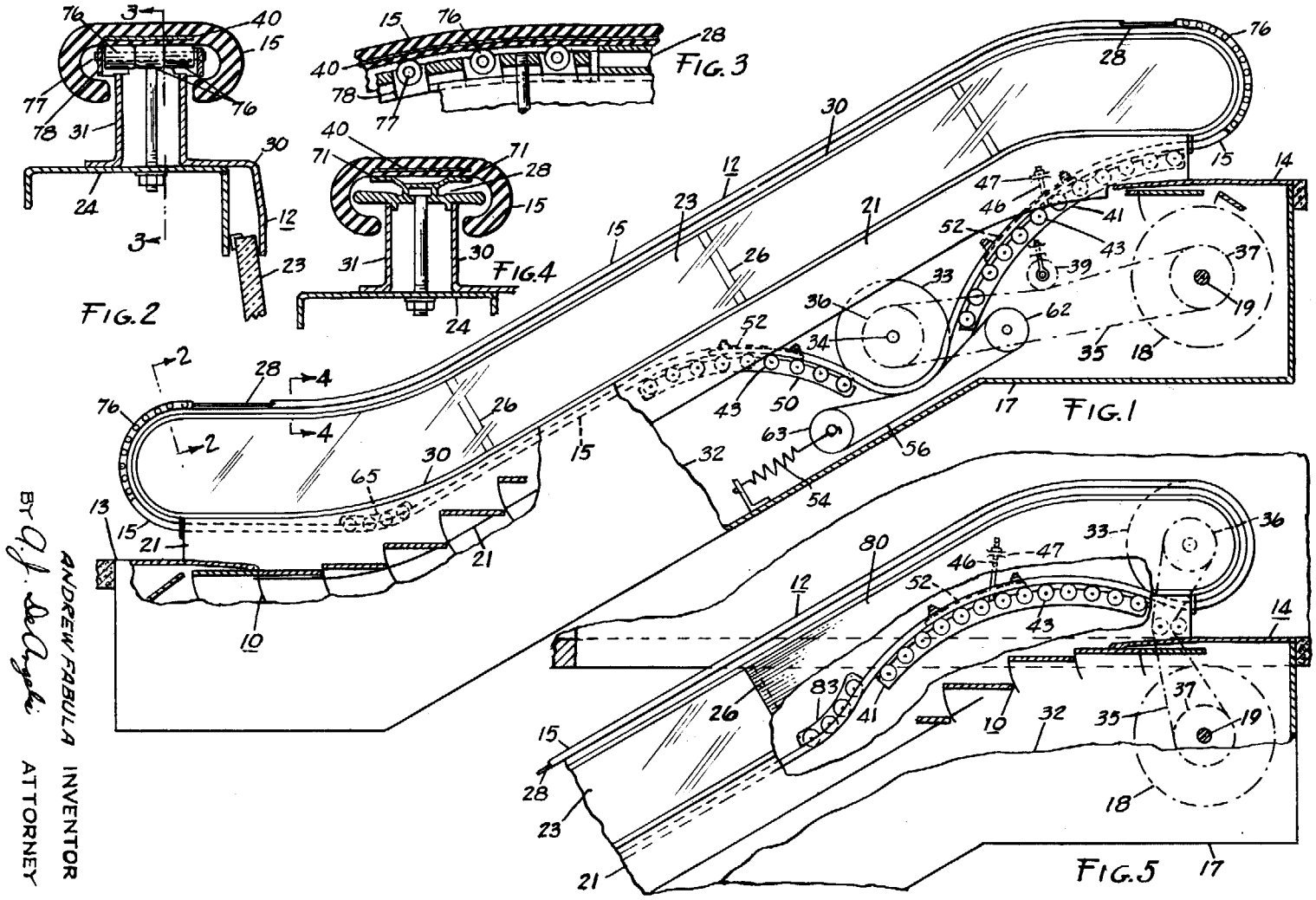
ANDREW FABULA INVENTOR
BY A. J. DeAngelis ATTORNEY United States Patent Office Re. 25,531
Reissued Mar. 10, 1964

25,531
PASSENGER CONVEYOR SYSTEM

Andrew Fabula, Hohokus, N.J., assignor to Otis Elevator Company, New York, N.Y., a corporation of New Jersey Original No. 3,049,213, dated Aug. 14, 1962, Ser. No. 23,932, Apr. 22, 1960. Application for reissue Mar. 6, 1963, Ser. No. 265,577
5 Claims. (Cl. 198—16)

Matter enclosed in heavy brackets [ ] appears in the original patent but forms no part of this reissue specification; matter printed in italics indicates the additions made by reissue.

This invention relates to [moving stairs and more particularly to] the *handrail and* balustrading [and] assembly *associated with a moving conveyor system and is more particularly concerned with the drive and support for such an assembly* [of the handrail structure for use with such stairs].

*In one form of the invention* [Moving] *moving* stairs *are employed as the load carrying element and* consist of individual steps usually interconnected in an endless loop by drive chains to which each side of the individual steps are fastened, the chains being powered by driving sprockets located within the structural truss which supports the assembly. Associated with the moving stairs are balustrades, one on each side of the stairs and extending from a lower to an upper landing. Atop each balustrade a moving handrail is guided in synchronism with the moving steps. The steps *as one form of the load carrying element,* are in platform or flat formation as they leave and enter the respective landings, and they assume their step formation, *in the specific showing,* in the intermediate inclined portion. Thus, the stairway takes the form of a lower *or second* and an upper *or first* landing section between which there is the inclined section where the steps are in step formation.

Each balustrade usually includes a skirt panel arranged vertically and closely adjacent to the sides of the steps. Above the skirt panel there is an interior panel which extends upwardly, sometimes at an angle, to the deck or top portion of the balustrade. Surmounting this deck there are fixtures supporting a guide track on which the C-shaped, canvas reinforced, rubber handrail rides. The exterior surface of the stairway *of the conveyor system* is usually finished to resemble the adjacent wall surfaces; such as, painted plaster on a wire lath base.

The lower and upper landing sections of each balustrade are usually made semicircular in shape. At each of these semicircular sections the space between the exterior wall of the stairway and the interior panel of the balustrade contains a rubber covered sheave which engages the inside surface of the C-shaped handrail. Generally, at the lower landing this sheave is an idler while the one at the upper landing is driven in synchronism with the driving sprockets that move the steps such that the handrail and steps move at the same uniform speed.

Although this type of stairway construction has generally been followed in the past, it seems desirable, and particularly so for buildings of more modernistic decor, to arrange the stairway such that the exterior plaster on wire lath section terminates at the height of the skirt panel; leaving only a skeleton balustrade framework to support the deck portion and the handrail guide track at a height convenient for stabilizing the passengers. The position formerly occupied by the interior panel may now be occupied by a side panel or panels of transparent material, which may suitably be of tempered glass or a transparent plastic material. This change makes mandatory a rearrangement of the return path of the handrail as well as the idler sheave and driving sheave—which [is] *if* left in their customary position would be visible at the upper and lower landing portions.

Accordingly, it is an object of this invention to provide a re-arranged handrail driving and guiding arrangement for moving stairs in which the side panel section of the balustrade may be transparent and in which the driving and idler sheaves as well as the return run of the handrail are concealed from view.

In carrying out the invention there is provided a moving stairway having an upper and a lower landing section and an intervening inclined portion, the stairway comprising an endless series of steps supported on a structural truss and positioned for movement between the landings, the steps being flanked by a balustrade terminating in a semicircular newel section at each of the landings, the balustrade having a handrail guide portion, and a side panel section intermediate the steps and the handrail guide portion, an endless moving handrail supported on the handrail guide portion, and mechanism for driving the series of steps and the handrail in synchronism with each other, in which the side panel section is transparent.

A better understanding of the invention may be derived from the following description when considered in conjunction with the drawings in which:

FIGURE 1 is a diagrammatic representation in side elevation, with parts broken away and parts in section, of a moving stairway embodying the invention;

FIGURE 2 is an enlarged view in section taken along the line 2—2 of FIGURE 1;

FIGURE 3 is a view in section taken along the line 3—3 of FIGURE 2;

FIGURE 4 is an enlarged view in section taken along the line 4—4 of FIGURE 1; and FIGURE 5 is a diagrammatic representation in side elevation of the upper portion of the moving stairway of FIGURE 1, modified as shown.

Referring first to FIGURES 1 through 4, the moving stairway includes a structural truss 17 supporting an endless series of steps 10, *in one form of the invention,* adapted for carrying passengers between balustrades 12, only one being shown, from a lower landing 13 to an upper landing 14. A moving handrail 15 in the form of a continuous loop is provided at each side of the stairs for the convenience of passengers. Each handrail is driven in synchronism with the moving steps, and on its exposed run is guided and supported at a convenient height above the stairs by the balustrade.

The steps 10 are driven by means of two running gear chains (not shown) which, at the upper end of the stairway, engage driving sprockets 18. Driving sprockets 18 are mounted on main drive shaft 19 which in turn is driven by a reversible driving mechanism (not shown). The steps emerge in platform formation from underneath the landing at their entrance end, transfer to step formation as they enter the inclined portion of the stairway and transfer back to platform formation as they leave the incline to disappear underneath the landing at their exit end.

Each balustrade terminates at the upper and lower landings in a vertically disposed semicircular section called a newel. The balustrade includes a skirt panel 21 mounted vertically, closely adjacent the sides of steps 10 and extending from the newel at the lower landing to that at the upper landing. Above skirt panel 21 and extending into the lower and upper newel sections is mounted a side panel 23. This panel extends upwardly to the deck portion 24 of the balustrade, which deck portion extends around both newel sections and is supported by balustrade brackets 26 mounted on truss 17 at spaced points along the stairway. A handrail guide track 28, upon which the exposed portion of handrail 15 rides, is supported on top of deck portion 24 by the upper parts of interior and exterior moldings 30 and 31 to form the periphery of the balustrade. Molding 30 completely encircles the side panels and its lower or inside portion is extended to cover and form a skirt for the top edge of side panel 23 and the junction of this panel and skirt panel 21 adjacent the moving stairs. The exterior of the stairway is covered by a plastered or other suitable surface to the height of skirt panel 21.

A rubber covered sheave 33 is mounted on stub shaft 34 in the inclined portion of truss 17 and is driven from main drive shaft 19 by means of sprocket chain 35 which engages sprocket wheels 36 and 37. A deflector sprocket 39, adjustably mounted on truss 17 provides the desired tension in the sprocket chain. Tensioning rollers 43 are arranged along arcuate supports 41 and 50 to guide and tension the C-shaped canvas reinforced rubber handrail in its passage from the upper newel section to engage, on its inner surface, the periphery of drive sheave 33. The arcuate support 41 is made adjustable by "take up" bolt 46 and its bracket 47. A steel tape 40 is embedded within the flat section of the handrail as an endless loop and reduces any tendency of the handrail to elongate by stretching. This plus the take up arrangement 46, 47 provides plenty of margin for adjusting the tension in the handrail. Short arcuate guides 52 contact the inside of the handrail on each side of sheave 33 to hold the rail on rollers 43 and insure proper alignment with the rim of sheave 33.

To increase the driving effect of sheave 33, a flat belt 56 is looped around idler sheaves 62 and 63 and compresses the handrail 15 against the rim of the sheave. The degree of this compression is a function of the elasticity of tensioning spring 54.

The total driving force exerted on handrail 15 by sheave 33 is a function of the angle of wrap between the rail and sheave, the tension in the rail, as induced by rollers 43 and tensioning bolt 46, as well as the added effect imparted by belt 56 in forcing the inside of the rail against the rim of the sheave.

At the lower landing a small arcuate roller guide 65 engages the inside surface of handrail 15, maintaining it below transparent side panel 23 and directing it properly for its journey around the periphery of the semicircular newel section.

The greatest resistance to passage of the handrail 15 occurs around the periphery of the lower and upper semicircular newels. For this reason it may be desirable to provide antifriction means for easing the passage over these sections. Preferably, small cylindrical rollers 76, proportioned to fit inside the C-shaped handrail, are rotatably mounted (FIGURES 2 and 3) on spindles 77 which in turn are supported on a semicircular roller cage 78. These rollers in their supporting cage form the periphery of the newel section and guide and support the handrail. The rollers may be either metallic or a plastic, such as nylon.

Alternatively, it may be satisfactory and desirable to continue the Y-shaped supporting track of guide 28 (FIGURE 4), which supports the handrail on its inclined run, to support it in encircling the newel portions. In such event, the handrail in emerging from behind the skirt panel 21 would be guided onto the Y-shaped track section instead of onto the cylindrical rollers 76. If such is the case, the top surfaces of the outwardly extending flanges 71 of the guide 28 (which surfaces contact and support the inside surface of the rail) may be coated with self-lubricating, low-frictional material such as, for example, polytetrafluoroethylene *which is sold under the trademark Teflon* [commonly called "Teflon"] or any other suitable material having the above described characteristics and suitable wearing qualities.

It may be noted that the aforementioned Y configuration of the guide track 28 obviates engagement between the inside surface of the handrail at its midsection and the Teflon coated surfaces of flanges 71. This construction prevents a coating of Teflon from adhering to the inside surface of the handrail at its midsection and interfering with the traction drive of the handrail by its driving sheave 33.

In some installations, it may not be desirable to provide transparent side panels at the upper landing portions of the balustrades, for example, where the upper landing portions of the balustrades are adjacent wall surfaces of the building. In such an installation, the construction shown in FIGURE 5 may be utilized for the upper portion of the stairway, while the remainder of the stairway is constructed as shown in FIGURES 1 to 4, as previously described. In this arrangement, the newel sections of the balustrades at the upper landing are constructed in the conventional manner with non-transparent interior panels 80 to conceal the handrail driving sheave 33 and tensioning device from view. The return run of the handrail 15 is guided below the level of the transparent side panel section by arcuate roller guide 83. Either the cylindrical rollers 76 or the plastic coated guide 28 may be used around the lower newel section to support and guide the handrail.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

What is claimed is:

1. *In a conveyor system* [A moving stairway] for carrying passengers from one landing to another, said *system* [stairway] having *a first* [an upper] and a *second* [lower] landing section and an intervening [inclined] portion supported on a structural truss, said *conveyor* [stairway] comprising; an endless *load carrying element* [series of steps] positioned on said truss for movement between said landings; a vertically disposed balustrade positioned along a side edge of said *load carrying element,* [steps,] said balustrade terminating in a semicircular newel section at each of said landings and *having* [consisting of] a handrail guide portion forming its periphery, a skirt panel section mounted closely adjacent the side edge of said *load carrying element* [steps] and extending [at] substantially [step height] from one of said semicircular newel sections to the other, and a side panel section of transparent material intermediate said skirt panel section and said handrail guide portion; an endless moving handrail supported on said guide portion for its exposed run; mechanism for driving said *load carrying element* [steps] and handrail in synchronism, said mechanism including a handrail drive sheave *rotatably* [rotably] mounted in the *intervening* [inclined] portion of said truss beneath the *lower* [lowermost] edge of said transparent side panel section in tractional engagement with the inner surface of said handrail, handrail tensioning devices mounted on said truss in said *intervening* [inclined] portion, one on each side of said drive sheave in position to engage the outer surface of said handrail and support it in contact with the drive sheave immediately before and after its engagement with said drive sheave, the tensioning means on one side being movable for effecting an adjustment of the tension in the handrail and the angle of wrap between the handrail and its drive sheave; and mechanism mounted on said truss in engagement with the inner surface of said handrail on its return run for maintaining the return run of said handrail at a level beneath the *lower* [lowermost] edge of said transparent side panel section.

2. *In a conveyor system* [A moving stairway] for carrying passengers from one landing to another, said *system* [stairway] having an upper and a lower landing section and an intervening inclined portion supported on a structural truss, said *conveyor* [stairway] *including* [comprising;] an endless series of steps positioned on said truss for movement between said *landings;* [landing;] a vertically disposed balustrade positioned along a side edge of said steps, said balustrade terminating in a semicircular newel section at each of said landings and consisting of a handrail guide portion forming its periphery and a side panel section of transparent material intermediate said steps and handrail guide portion; an endless moving handrail supported on said guide portion for its exposed run; mechanism for driving said steps and handrail in synchronism, said mechanism including a handrail drive sheave rotatably mounted in the inclined portion of said truss beneath the *lower* [lowermost] edge of said transparent side panel section in tractional engagement with the inner surface of said handrail, mechanism mounted on said truss in engagement with the outer surface of said handrail during its return run for directing the inner surface of said handrail into tractional engagement with said drive sheave and for maintaining the return run of said handrail at a level beneath the *lower* [lowermost] edge of said transparent side panel section, said means comprising two groups each of a plurality of rollers arranged along long arcs of large radius contacting the outer surface of said handrail and supporting it in a gentle reverse bend with its inner surface in tension against the rim of said drive sheave, said rollers being in contact with said handrail substantially until said rail makes and breaks its engagement with said sheave, and means mounted on said truss and pressing against the outer surface of said handrail for a considerable portion of the span of engagement of said rail and its driving sheave thus compressing said handrail against the rim of said drive sheave for increasing tractional engagement between said handrail and said sheave.

3. *In a conveyor system* [A moving stairway] as set forth in [claim 8] *claim 2* wherein said means compressing said handrail against the rim of said drive sheave comprises, two idler sheaves *mounted on said truss,* one on each side of said drive sheave, with their rims above the level of the point of tangency of said drive sheave *with* [at] a line drawn between said idler sheaves, [mounted on said truss,] one of said sheaves being mounted on a shaft movable with respect to the shaft of the other idler sheave; a flat belt looped around said sheaves, said belt engaging said handrail where said handrail rides on the rim of said drive sheave; and a spring attached at one of its ends to said movable shaft and at the other end to said truss for tensioning said flat belt, thereby compressing said handrail against the rim of said drive sheave.

4. *In a conveyor system* [A moving stairway] in accordance with claim 3 wherein a plurality of cylindrical rollers are mounted in a substantially 180° arcuate section around the outer periphery of each *semicircular* [semi-circular] newel section and slidably support said handrail in encircling each said section.

5. *In a conveyor system in accordance with claim 1 wherein a plurality of cylindrical rollers are mounted in a substantially 180° arcuate section around the outer periphery of each semicircular newel section and slidably support said handrail in encircling each said section.*

References Cited in the file of this patent or the original patent

UNITED STATES PATENTS

| | | |
|---|---|---|
| 994,879 | Seeberger | June 13, 1911 |
| 2,660,286 | Margles | Nov. 24, 1953 |
| 2,929,483 | Minejiro Jin | Mar. 22, 1960 |

FOREIGN PATENTS

| | | |
|---|---|---|
| 601,826 | Great Britain | May 13, 1948 |